Sept. 10, 1963     H. R. COOK     3,103,094
SAFETY-TYPE, ROTARY VEGETATION CUTTING BLADE
Filed May 24, 1962     3 Sheets-Sheet 1
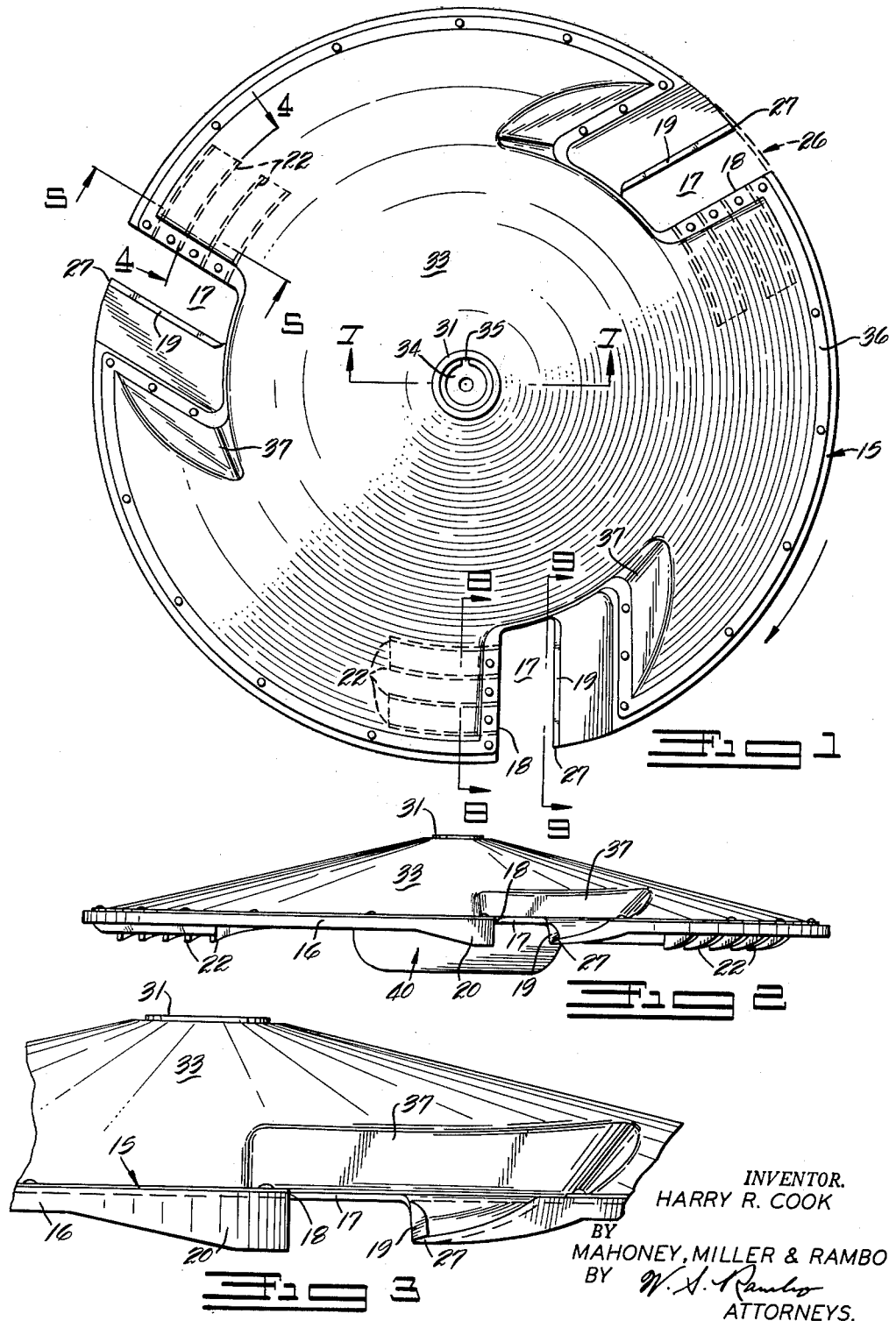
INVENTOR.
HARRY R. COOK
BY MAHONEY, MILLER & RAMBO
BY
ATTORNEYS.

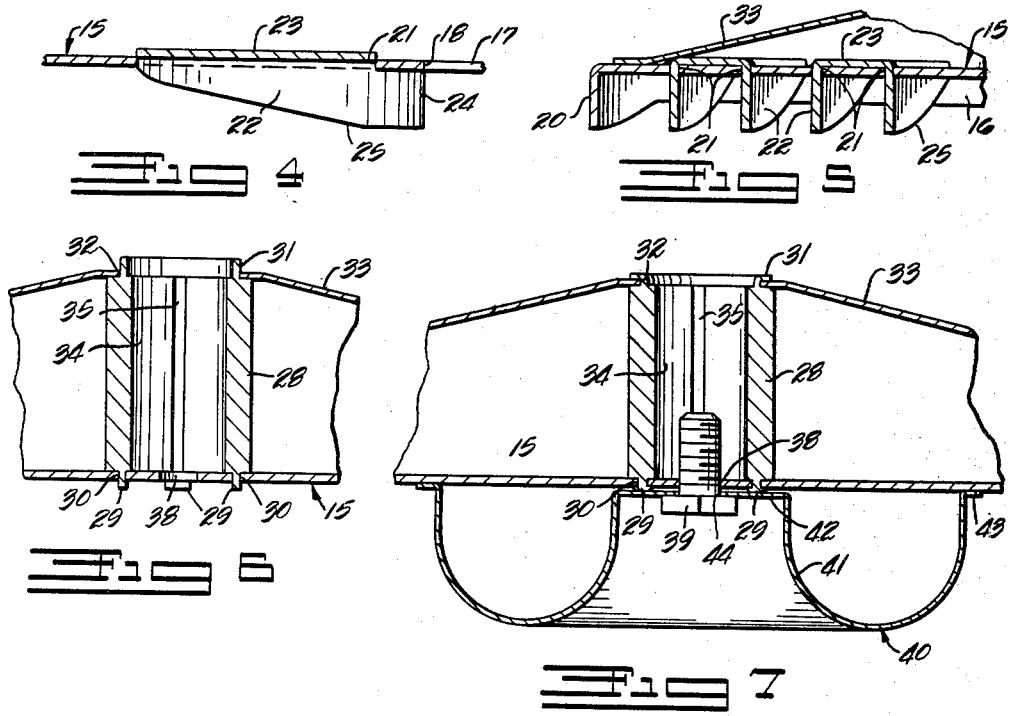
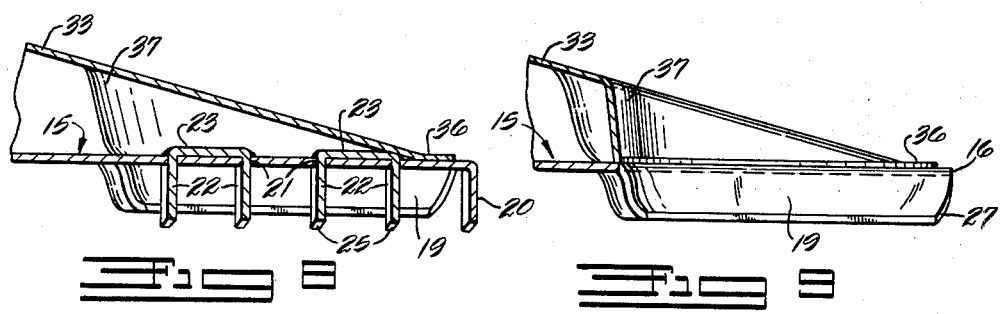
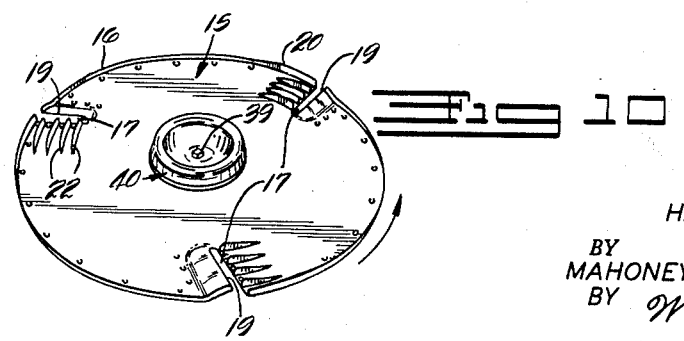
INVENTOR.
HARRY R. COOK
BY
MAHONEY, MILLER & RAMBO
BY
ATTORNEYS.

Sept. 10, 1963  H. R. COOK  3,103,094
SAFETY-TYPE, ROTARY VEGETATION CUTTING BLADE
Filed May 24, 1962  3 Sheets-Sheet 3
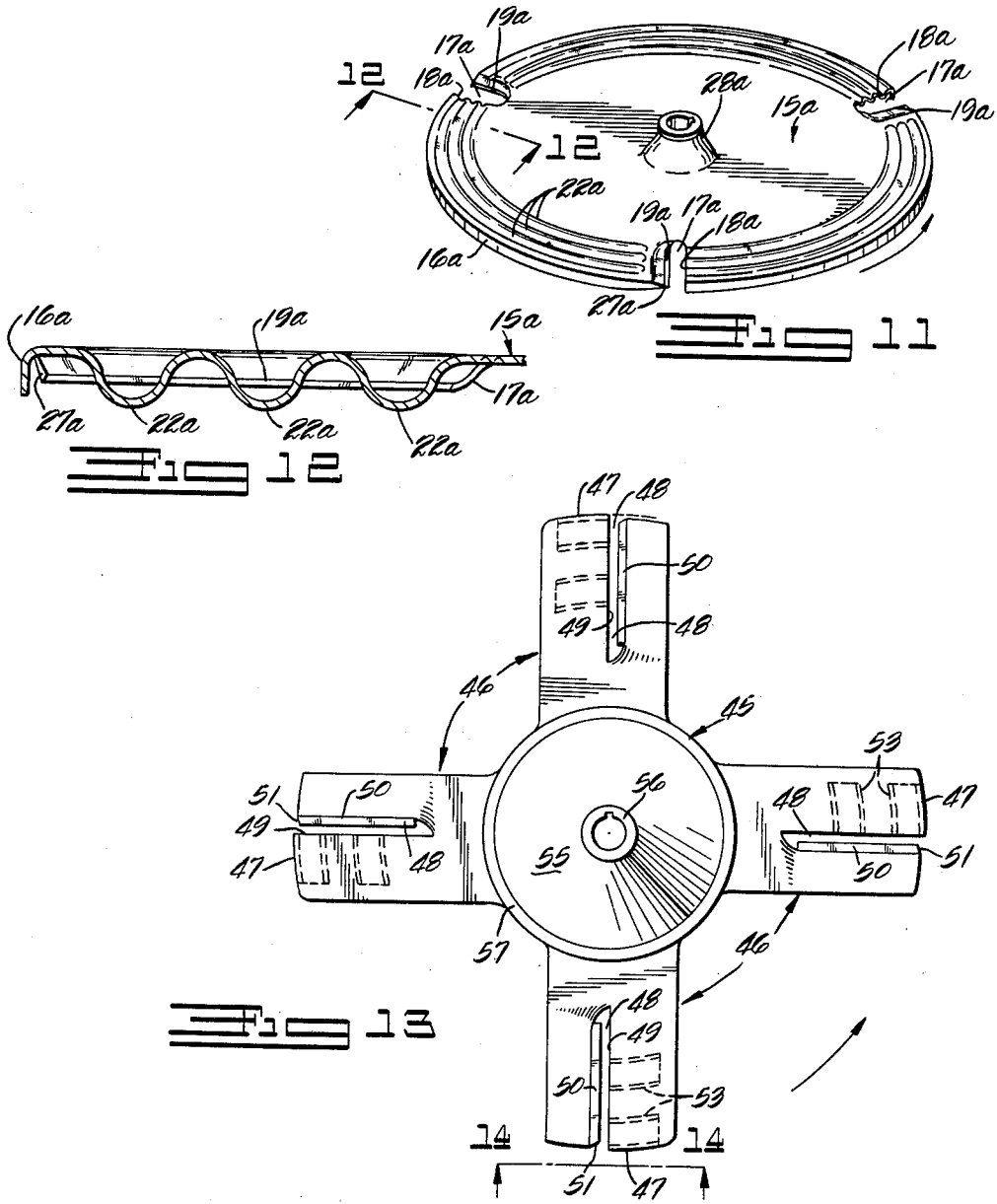
INVENTOR.
HARRY R. COOK
BY
MAHONEY, MILLER & RAMBO
BY 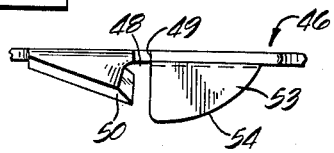
ATTORNEYS.

United States Patent Office 3,103,094
Patented Sept. 10, 1963

3,103,094
SAFETY-TYPE, ROTARY VEGETATION
CUTTING BLADE
Harry R. Cook, Columbus, Ohio
Filed May 24, 1962, Ser. No. 197,528
15 Claims. (Cl. 56—295)

The present invention relates generally to rotary vegetation cutting blades, and more specifically to an improved safety-type rotary cutting blade for power-driven, rotary-type lawn mowers or similar machines.

This application is a continuation in part of and a replacement for my prior, copending U.S. patent applications Serial No. 115,969, filed June 9, 1961 and Serial No. 133,007, filed July 28, 1961, both entitled, "Mower Blade," which are being abandoned concurrently with the filing of this application.

In the past, various forms and types of blades have been proposed for use in power-driven, rotary-type lawn mowers, that is, power-driven lawn mowers of the type having a cutting blade arranged for relatively high speed rotation in a generally horizontal plane within the confines of an open bottom, wheel mounted casing. However, the principal objection to these rotary-type mowers and the cutting blades embodied therein stems from the inherently dangerous nature of the high speed cutting blades which are not only capable of projecting stones or other solid objects at lethal velocities, but which annually account for a startling number of amputations nad severe lacerations of the hands and feet of careless operators or attendants. The greater majority of amputations and lacerations by the blade of a rotary lawn mower result from an operator carelessly sticking his fingers or feet in the tangential discharge chute of the mower casing, or causing or permitting the mower to run over a foot, thereby making contact with the sharpened cutting edges of the whirling blade with disastrous and painful results.

Accordingly, it is the primary object of this invention to provide a rotary cutting blade for power lawn mowers and similar power-driven vegetation cutting apparatus which is so designed and constructed as to minimize, if not totally eliminate, the dangers attendant to the usual type of high speed, rotary vegetation cutting blades.

Another object of the invention is to provide a safety-type rotary cutting blade which, while being capable of efficient cutting of blades of grass and other relatively small size vegetation, will not amputate or severely lacerate the hand, fingers or foot of a person coming in contact with the blade during normal operating rotation thereof, and which will not pick up and project rocks or stones or other relatively large size objects outwardly through the discharge chute of the associated lawn mower casing at dangerous velocities.

A further object of the invention is to provide a safety-type lawn mower blade or vegetation cutter which includes a generally flat main body portion adapted to be driven in high speed rotation about a central vertical axis and having one or more generally radially disposed grass-cutting edges formed or otherwise carried in inwardly recessed or spaced relation to the extreme outer periphery of the blade so as to sever blades of grass or other relatively small size vegetation coming in contact with the cutting edges from underneath the blade, and which is further provided with one or more guard fingers or relatively smooth projections arranged in rotational advance of the cutting edge or edges of the blade so as to forcibly deflect relatively larger size objects, such as a foot, finger or larger sizes of stones, out of the path or plane of rotation of the cutting edge or edges of the blade.

Yet another object of the present invention is to provide a safety-type cutting blade of this character which may be readily and easily installed upon and used in ordinary and standard types of rotary, power-driven lawn mowers, as a replacement for the usual cutter bar or blade, without requiring any structural modification to the mower.

For a further and more detailed understanding of the present invention and the various additional objects and advantages thereof, reference is made to the following description and the accompanying drawings, wherein:

FIG. 1 is a top plan view of a preferred embodiment of rotary lawn mower blade formed in accordance with the present invention;

FIG. 2 is an elevational view looking toward the peripheral edge of the blade shown in FIG. 1;

FIG. 3 is an enlarged, fragmentary edge elevational view looking into one of the cutting edge slots of the blade;

FIG. 4 is a detailed, fragmentary vertical sectional view taken along the line 4—4 of FIG. 1 and showing one of the guard fingers of the blade;

FIG. 5 is a similar view taken along the line 5—5 of FIG. 1 and showing particularly the relationship of the guard fingers to the peripheral edge of the cutter blade;

FIG. 6 is a detailed, fragmentary vertical sectional view showing an intermediate stage in the assembly and connection of the shaft-receiving hub to the blade body and its associated conical reinforcing shroud;

FIG. 7 is a fragmentary vertical sectional view taken through the hub assembly and the anti-scalp guard along a plane indicated by the line 7—7 of FIG. 1;

FIGS. 8 and 9 are detailed vertical sectional views taken respectively along the lines 8—8 and 9—9 of FIG. 1;

FIG. 10 is a small scale perspective view of the underside of the blade shown in FIG. 1;

FIG. 11 is a small scale perspective view looking toward the upper surface of a modified embodiment of the present invention;

FIG. 12 is a detailed, fragmentary vertical sectional view taken along the line 12—12 of FIG. 11;

FIG. 13 is a top plan view of another modified form of the present invention; and FIG. 14 is a fragmentary edge elevational view along the line 14—14 of FIG. 13.

Referring now to the drawings, FIGS. 1 through 10 illustrate a presently preferred form and construction of my improved safety blade, wherein the numeral 15 designates a generally flat, circular, metal disc or plate which forms the main body portion of the blade. The disc 15 terminates at its periphery in a downturned flange 16 and is formed along its outer edge portion with three equidistantly and circumferentially spaced, generally rectangular slots 17. It will here be understood that the number of slots 17 is not critical, and while I have chosen to illustrate three of such slots, this number is selected as a matter of preference only and could be one, two, four or even more, depending upon the size of the blade and the number of cutting edges desired. Each of the slots 17 is identical in size and shape, and each extends inwardly from the outer periphery of the disc 15 a distance equal to approximately one-fifth the diameter of the disc. As will be seen particularly in FIG. 1, the axes of the slots 17 are disposed at a slight angle to a radial line drawn through the center of the disc, although the slots 17 may, if desired, be formed along an exactly radial line as indicated in the modified forms of blades shown in FIGS. 11 and 13 respectively.

Each of the slots 17 is defined on the opposite sides thereof by a leading edge 18 and a trailing edge 19. The leading edge of each slot is disposed in the plane of the disc 15, while the trailing edge portion 19 is bent downwardly and sharpened, so as to form a downturned cutting edge disposed in downwardly offset relation to the plane of the disc 15 and inclined forwardly in the direction of rotation of the blade, indicated by the clockwise arrow in FIG. 1. The slots 17, the downturned peripheral flange 16 and the downturned cutting edges 19 are preferably formed from a single, flat blank in a single blanking and drawing operation in a press. The peripherl flange 16, forwardly of each of the leading edges 18, is preferably extended a distance below the remainder of the flange 16 to form a forwardly tapering outer guard finger 20 whose rearward edge projects downwardly a distance greater than the cutting edge 19 of the disc.

In advance of each of the slots 17, the disc 15 is formed with a series of circumferentially extending, relatively radially spaced, parallel, arcuate slots or slits 21. (See FIGS. 4 and 5.) Extending through each adjacent pair of slits 21 are a set of downwardly projecting, forwardly tapering and relatively narrow guard fingers 22. Each set of guard fingers 22 is connected by an upper, horizontal cross web 23 which extends across the upper surface of the disc 15 in the area thereof between each pair of slits 21. Preferably, each of the guard fingers 22 is extended rearwardly a distance beyond the connecting cross web to form a tail portion 24 which terminates substantially flush with the leading edge 18 of the associated slot 17. Thus, in assembling the sets of guard fingers 22 within the slits 21, the tail portions 24 of each set are first introduced through the upper side of the slits 21 and hooked under the portion of the disc 15 lying between the leading edge of the slot 17 and the rear ends of the slits 21, and then the remaining portions of the guard fingers are pressed downwardly through the slits 21 and the cross webs 23 of each set of guard fingers is then welded or otherwise rigidly secured to the disc 15. This interlocking hooked and welded engagement between the sets of guard fingers and the disc makes for an extremely strong and rugged connection and assures that the guard fingers will not become accidentally loosened within the slits 21 during normal high speed rotation of the cutter blade.

As seen particularly in FIG. 8, each of the guard fingers 22, as well as the peripheral guard finger 20, extends downwardly a distance greater than the cutting edges 19, and hence intersects and passes through the path or plane of rotation of the cutting edges 19. Also, each of the guard fingers 22 terminates in a relatively smooth lower edge surface 25 which tapers upwardly and forwardly in the direction of rotation of the blade toward the underside of the disc 15, thus eliminating any abrupt vertical edge facing in the direction of rotation. Thus, in effect, the guard fingers 20 and 22, being mounted in rotational advance of and projecting downwardly below the plane of rotation of the cutting edges 19 of the disc, function during rotation of the disc as a comb for the comparatively flexible blades of grass being traversed by the lawn mower, thus permitting the relatively narrow, flexible blades of grass to pass therebetween and into the path of rotation of the cutting edges 19. At the same time, the tapered lower edge surfaces 25 of the guard fingers 20 and 22 will tend to deflect any large size solid objects, such as stones, fingers or feet, downwardly out of the path of rotation of the trailing cutting edges 19, thus preventing dangerous contact between such objects and the cutting edges.

Also, as will be noted by the dotted line indications at 26 in FIG. 1, the outmost end 27 of each of the cutting edges 19 is radially inset a slight distance from the outer peripheral flange 16 and outer guard fingers 20 so as to prevent contact of the cutting edges 19 with an object moving radially inwardly toward the edge of the disc 15. In this regard, it will be understood that the combined widths of the slots 17 compared with the substantially larger dimension of the unslotted outer peripheral flange 16 of the disc make it highly improbable, if not practically impossible, for an object to move radially inwardly into the open end of one of the slots 17 during rotation of the disc 15 even at normal idling speeds of 300–500 r.p.m., let alone at normal cutting speeds of from 3000 to 3600 r.p.m. Also, it will be understood that an object moving radially inwardly of the plane of the disc will normally strike the smooth peripheral flange 16 and thus be held outwardly from the radially inset terminal ends 27 of the cutting edges 19. This is due to the fact that the outer tips 27 of the cutting edges 19, even during relatively slow idling speeds (300–500 r.p.m.), move at such a high linear velocity that the tips 27 will traverse a distance equal to the widths of the slots 17 in such a short interval of time that it would be practically impossible for an object to move radially inwardly from the outer surface of the peripheral flange 16 to the tip 27 of the cutting edge before the tip 27 moves a distance equal to the width of the associated slot. Actual tests conducted with the present cutter blades reveal that a radial insetting of the tips 27 of the cutting edges 19 of approximately one-eighth inch on a nineteen inch diameter blade is sufficient to prevent entry of a person's finger radially inwardly into contact with the tips 27 of the cutting edges.

Connected with the central portion of the disc 15 and extending upwardly therefrom is a tubular, shaft-receiving hub or socket 28. As shown in FIGS. 6 and 7, the lower end of the hub 28 is preferably formed with a plurality of circumferentially spaced, downwardly extended rivet-forming lugs 29 which are initially passed downwardly through a set of cooperatively shaped slots 30 formed in the disc 15 (see FIG. 6) and then bent or swaged on the underside of the disc (see FIG. 7) to securely lock the hub 28 to the disc 15. At its upper end, the hub is formed initially with a reduced diameter annular flange 31 which is arranged to extend through a cooperative opening 32 formed in the center of a substantially conical sheet metal reinforcing shroud 33. Upon assembly, the annular flange 31 of the hub is swaged outwardly and downwardly around the edge of the shroud 33 which defines the opening 32 to securely clamp the shroud to the hub 28.

The hub 28 is also formed with a cylindrical, axially extending bore 34 for the reception of the lower end portion of the engine drive shaft of the associated lawn mower, not shown. A longitudinal keyway 35 is formed in the side wall of the bore 34 for the reception of a drive shaft-carried key, not shown, which establishes a driving connection between the hub 28 and the drive shaft of the power lawn mower.

The shroud 33 takes the form of a relatively flat cone radiating downwardly and outwardly toward the periphery of the disc 15 and terminates in a flat peripheral skirt or marginal flange 36 which is riveted or otherwise rigidly secured to the disc at spaced intervals toward the outer periphery thereof. Advantageously, the shroud 33 is formed in the areas of the slots 17 of the disc with shape-conforming recesses 37, and is bent downwardly around the recesses 37 so as to insure a smooth, uninterrupted flow of air and grass clippings from the cutting edges 19 across the upper surfaces of the shroud. The shroud 33 functions to reinforce and strengthen the disc against axial deflection and to provide for the smooth flow of air and grass clippings over the upper surface of the blade.

Referring once again to FIG. 7 of the drawings, it will be noted that the disc 15 is formed with a central, bolt-receiving opening 38 of relatively smaller diameter than the bore 34 of the hub 28. In securing the blade to an associated engine drive shaft, a screw-threaded clamping bolt 39 is passed upwardly through the opening 38 of the disc and threaded into a cooperatively threaded axial bore formed in the lower end of the engine drive shaft, not shown.

The present blade further comprises an annular, semi-toroidal, anti-scalp guard 40 which is mounted on the central underside of the disc 15 by means of the clamping bolt 39. As best seen in FIG. 7, the anti-scalp guard 40 is preferably formed as a sheet metal stamping having a downwardly projecting annular main body portion 41, a central flat web portion 42 and an outwardly turned flat marginal flange 43. The central flat web portion 42 is formed with a bolt-receiving opening 44 disposed in axial alignment with the opening 38 of the disc, and the clamping bolt 39 also passes through the opening 44 to clamp the guard 40 to the underside of the disc. The anti-scalp guard projects downwardly below the disc a distance greater than the guard fingers 20 and 22 and functions to prevent the guard fingers and peripheral edge portions of the blade from striking or digging into the soil in the event the blade is tilted at a relatively steep angle with respect to the horizontal, due to the passage of the wheels of the mower over uneven terrain. As will be understood, the anti-scalp guard 40, being the lowest surface on the underside of the blade, will normally strike the ground before the outer peripheral portions of the blade, when the same is tilted to a relatively sharp angle, and will thus prevent undesired scalping of the grass and possible damage to the guard fingers of the blade.

In the operation of the blade disclosed in FIGS. 1 through 10 of the drawings, the blade and its anti-scalp guard 40 are secured to the lower end of the engine drive shaft of an associated lawn mower, not shown, by means of the bolt 39. In this condition, the blade is drivingly connected with the drive shaft of the lawn mower by means of the keyway 35 and an associated key, not shown, carried by the engine drive shaft. The blade is arranged to be driven in clockwise rotation, as viewed in FIG. 1. Thus, as the blade rotates at normal cutting speeds of say 3200 to 3600 r.p.m., the downturned and forwardly inclined cutting edges 19 function in the manner of fan blades to suck air and blades of grass upwardly from below the disc 15, through the slots 17 and into the path of rotation of the cutting edges 19. The blades of grass cut by the edges 19 will be propelled and discharged from above the blade by way of the usual tangential discharge chute or chutes of the lawn mower casing or housing, not shown. As previously indicated, the guard fingers 20 and 22 of the blade serve merely to comb the grass ahead of the cutting edges 19 while preventing entry of relatively larger size solid objects upwardly into the path or plane of rotation of the cutting edges.

FIGS. 11 and 12 of the drawings illustrate a slightly modified form of my improved cutter blade, wherein the guard fingers 22a are formed as integral corrugations stamped or otherwise formed toward the outer periphery of the disc body 15a. The disc body 15a is provided in its central region with an upstanding shaft-receiving hub 28a which is welded or otherwise suitably secured to the disc. The disc 15a is also provided at its periphery with the downturned flange 16a and three radially disposed slots 17a which define the downturned, forwardly inclined cutting edges 19a. Thus, the guard fingers or corrugations 22a extend circumferentially around the disc 15a from the leading edges 18a of each slot 17a and terminate just short of the downturned cutting edge 19a of the next adjacent slot 17a. The fingers or corrugations 22a are tapered upwardly at their leading ends into smooth flush registry with the plane of the disc 15a. Thus, the modified blade shown in FIGS. 11 and 12 is substantially identical in function to the preferred form of blade shown in FIGS. 1–10, except that the guard fingers 22a are formed as a series of integral corrugations which project downwardly below the disc 15a a distance greater than the cutting edges 19a to prevent entry of relatively large size solid objects into the path of rotation of the cutting edges. The outmost tips 27a of the cutting edges 19a are also inset radially from the peripheral flange 16a to substantially prevent contact between the cutting edges 19a and a body moving radially inwardly of the outer edge of the blade.

In FIGS. 13 and 14, I have shown another modified form of safety-type cutting blade formed in accordance with my invention. In this instance, the main body portion of the blade takes the form of a generally flat body formed to include a circular, disc-like central portion 45 having four, equally spaced, outwardly radiating arms or bars 46. Each of the arms 46 terminates in an extreme outer edge portion 47, and is formed with a radially inwardly extending slot 48 defined on opposite sides thereof by a straight leading edge 49 and a downturned, forwardly inclined cutting edge 50. The outermost tip 51 of each cutting edge 50 is radially inset with respect to the extreme outer edge portion 47 of each arm.

Carried on each of the arms 46, in rotational advance of each cutting edge 50, are sets of circumferentially directed, radially spaced and downwardly projecting guard fingers 53. The sets of guard fingers 53 are preferably welded to the undersides of the arms 46, and each is formed with a smooth, curved, lower edge surface 54 which tapers upwardly and forwardly from a line coincident to the leading edge 49 of each slot to the undersurface of the arm 46. In this regard, it will be noted that the sets of guard fingers 53 are similar to the guard fingers 22 employed in the preferred form of blade illustrated in FIGS. 1–10, but instead of being mounted in slots, the guard fingers 53 are simply welded or otherwise secured to the undersurfaces of the arms 46. Preferably, the circular central portion 45 of the blade is covered on its upper surface by a conical, sheet metal shroud 55 which is secured in its central region to the central, upstanding, shaft-receiving hub 56, and which is formed with a flat marginal flange or skirt 57 welded or otherwise suitably secured to the upper surface of the central portion 45 of the blade.

It will thus be apparent that the blade shown in FIGS. 13 and 14 functions in substantially the same manner as the blades heretofore described, in that the guard fingers 53 serve to deflect relatively large size solid objects downwardly out of the plane of rotation of the cutting edges 50, while at the same time permitting blades of grass to pass therebetween into the plane of rotation of the cutting edges 50. Also, the radial insetting of the tips 51 of the cutting edges 50 with respect to the extreme outer edge portions 47 of the arms 46 serves to prevent contact of the cutting edges with a solid body moving radially inwardly of the blade during rotation thereof at normal cutting speeds. The downturned, forwardly inclined cutting edges 50 function in the manner of fan blades to suck air and blades of grass up into the slots 48 and to propel the air and grass clippings tangentially outwardly through the discharge chute or chutes of the associated mower casing or housing, not shown.

In view of the foregoing, it will be seen that the present invention provides an efficient, yet structurally simple rotary cutting blade for power lawn mowers and similar power-driven vegetation cutting machines, such as lawn edgers, hedge trimmers and the like, and wherein the blade provides a maximum degree of protection against contact of the relatively sharp cutting edges thereof with relatively large size solid objects, such as fingers, feet, or larger size stones and sticks which strike the blade at its periphery or on its underside. In this regard, it will be understood that the rotationally advanced guard fingers and the extreme outer peripheral edge portion of the blade serve, in effect, as relatively smooth cam surfaces to deflect the fingers and feet of a person away from the cutting edges during rotation of the blade, and thereby prevent painful lacerations and/or amputations heretofore prevalent with the ordinary types of rotary cutting blades.

While certain preferred embodiments of the present invention have been illustrated and described in detail, it will be understood that various additional modifications as to details of construction and design may be resorted to without departing from the spirit of the invention or the scope of the following claims.

Having thus described my invention, what I claim is:

1. A safety-type, rotary, vegetation-cutting blade comprising a generally flat, planar body portion having a central axis of rotation and an extreme outer edge portion disposed radially outwardly from the axis of rotation of said body portion, a cutting edge carried by the body portion of said blade in radially outwardly spaced relation to the axis of rotation thereof, but terminating radially inwardly from the extreme outer edge portion of said body portion, said cutting edge projecting a distance axially outwardly beyond the plane of said body portion on one side thereof; and a relatively narrow guard element carried by said body portion in rotational advance of said cutting edge, said guard element projecting axially outwardly from said one side of said body portion a distance beyond said cutting edge and being operable upon rotation of said body portion to deflect relatively large size objects out of the path of rotation of said cutting edge while permitting relatively smaller size vegetation to enter the path of rotation of said cutting edge.

2. A safety-type, rotary, vegetation-cutting blade comprising a body formed with a generally flat main body portion having a central axis of rotation and an extreme outer edge portion disposed radially outwardly from the axis of rotation of said main body portion; a cutting edge carried on said body and projecting generally axially outwardly beyond the main body portion at one side thereof, said cutting edge being located intermediate the axis of rotation of said body and the extreme outer edge portion thereof and being disposed in a plane of rotation generally parallel to but spaced outwardly from the plane of rotation of said main body portion; and a guard element carried by said body in rotational advance of said cutting edge, said guard element projecting axially outwardly from said one side of the main body portion in intersecting relation to the plane of rotation of said cutting edge and being operable upon rotation of said body to deflect relatively large size objects out of the plane of rotation of said cutting edge while permitting relatively smaller size vegetation to enter the plane of rotation of said cutting edge.

3. A safety-type grass cutting blade for a rotary-type power lawn mower comprising a generally horizontally arranged blade means adapted to be driven in rotation by said mower, said blade means having a main body portion and an outer edge portion and a downwardly inclined cutting edge carried by and projecting below the main body portion of said blade means and disposed a distance inwardly from the outer edge portion thereof; and a downwardly projecting guard element carried by said blade means in rotational advance of said cutting edge, said guard element being relatively narrower than said cutting edge and extending vertically below the plane of rotation of the cutting edge and being operable upon rotation of said blade means to deflect relatively large size objects out of the plane of rotation of said cutting edge while permitting blades of grass to enter the plane of rotation of said cutting edge.

4. A safety-type grass cutting blade for a rotary-type power lawn mower comprising a generally horizontally arranged blade means having a generally flat main body portion terminating in an extreme outer edge portion, said main body portion having a centrally disposed hub member for drivingly connecting said blade means to a driven member of said mower; a downwardly inclined grass cutting edge carried on and projecting below the main body portion of said blade means, said cutting edge terminating a distance inwardly from the extreme outer edge portion of said blade means; and a relatively narrow guard finger carried by said blade means in rotational advance of said cutting edge, said guard finger extending downwardly through the plane of rotation of the cutting edge and being operable upon rotation of said blade means to deflect relatively large size objects out of the plane of rotation of said cutting edge while permitting blades of grass to enter the plane of rotation of said cutting edge.

5. A safety-type, rotary, vegetation-cutting blade comprising a body having a main body portion and an extreme outer edge portion, said main body portion including a centrally disposed hub member for connection with a driving shaft and defining on said body a central axis of rotation; a plurality of vegetation-cutting edges formed on said body and projecting axially outwardly from one side thereof and inclined in the direction of rotation of said body, each of said vegetation-cutting edges terminating a distance radially inwardly from the extreme outer edge portion of said body; and a guard element carried by said body in rotational advance of each of said cutting edges, each of said guard elements being narrower than said cutting edges and projecting axially outwardly from said one side of said body and through the plane of rotation of said cutting edges and being operable upon rotation of said blade means to deflect relatively large size objects out of the plane of rotation of said cutting edges while permitting relatively smaller vegetation to enter the plane of rotation of said cutting edges.

6. In a power-driven, rotary lawn mower, a generally horizontally disposed blade arranged for rotation about a vertical axis, said blade comprising a generally flat main body portion provided with a central shaft-receiving hub defining an axis of rotation and an extreme outer edge portion disposed radially outwardly from said axis of rotation, said main body portion being formed with a slot extending a distance inwardly from the extreme outer edge portion of said blade; a downwardly inclined, sharpened cutting edge carried by said main body portion contiguous to one side of said slot, said cutting edge projecting downwardly a distance below the plane of said main body portion and terminating a distance inwardly from the extreme outer edge portion of said blade; and a plurality of relatively spaced, vertically depending guard fingers carried by said main body portion in rotational advance of said slot and said cutting edge, each of said guard fingers being relatively narrower than said cutting edge and having a lowermost surface projecting downwardly a distance greater than said cutting edge and tapering upwardly toward said main body portion in the direction of rotation of said blade and being operable upon rotation of said blade to deflect relatively large size objects out of the path of rotation of said cutting edge while permitting blades of grass to enter the path of rotation of said cutting edge.

7. The combination defined in claim 6, wherein the main body portion of said blade comprises a substantially flat, metal disc having a downturned flange extending around its periphery except in the area of said slot, and wherein said cutting edge is formed as an integral part of said disc and terminates inwardly from said downturned flange.

8. The combination defined in claim 7, including a generally conical reinforcing shroud connected with the hub of said main body portion and extending radially outwardly and downwardly above the upper surface of said disc and secured to said disc a distance inwardly from the periphery thereof.

9. The combination defined in claim 7, wherein said guard fingers comprise a series of parallel, radially spaced, arcuately curved corrugations formed in said disc inwardly from the peripheral edge thereof and extending generally circumferentially of said disc in rotational advance of said cutting edge.

10. The combination defined in claim 6, wherein the main body portion of said blade comprises a substantially flat, metal bar having a plurality of arms extending radially outwardly from said central shaft-receiving hub and disposed in relatively circumferentially spaced relation to one another; and wherein each of said arms is formed with a generally radially disposed slot extending a distance inwardly from the outer end thereof, each said slot having a leading edge and a trailing edge as defined by the direction of rotation of said blade, with the trailing edge of each said slot being bent downwardly below the plane of said bar and forming a cutting edge terminating inwardly from the outer end of said bar, and wherein said guard fingers comprise a plurality of relatively narrow metal strips secured to and projecting downwardly from said arms in rotational advance of the leading edges of said slots.

11. A safety-type grass-cutting blade for a rotary-type power lawn mower comprising a generally horizontally arranged blade means adapted to be driven in rotation by said mower, said blade means having a main body portion and an extreme outer edge portion and a plurality of downwardly inclined grass-cutting edges carried by and projecting below the main body portion, said cutting edges being disposed along a plane of rotation parallel to but spaced downwardly below the plane of rotation of said main body portion and each of said cutting edges terminating a distance inwardly from the extreme outer edge portion; and a relatively narrow, downwardly projecting guard member carried by said blade means in rotational advance of each of said cutting edges, said guard members extending a distance vertically below the plane of rotation of the cutting edges and being operable upon rotation of said blade means to deflect relatively large size objects downwardly out of the plane of rotation of said cutting edges while permitting blades of grass to enter the plane of rotation of said cutting edges.

12. A safety-type grass-cutting blade according to claim 11, wherein the main body portion of said blade means is provided in its central region with a generally circular, anti-scalp device which extends downwardly below the main body portion a distance greater than said guard members for preventing engagement of said guard members with the terrain traversed by said blade means.

13. A rotary, disc-type vegetation cutter blade comprising a generally flat disc-shaped metal plate having a centrally disposed hub portion defining an axis of rotation normal to the plane of said plate, said plate terminating in an extreme outer peripheral edge portion and being formed with a plurality of circumferentially spaced slots extending a distance inwardly from the outer peripheral edge portion of said plate generally toward the hub portion thereof, each of said slots being defined on opposite sides thereof by a leading edge and trailing edge, as defined by the direction of rotation of said blade, the trailing edge portion of each of said slots being bent axially outwardly from one side of said plate and terminating in a substantially straight, sharpened cutting edge disposed in a plane parallel to but spaced from said one side of said plate, said cutting edge terminating in radially inwardly spaced relation to the extreme outer peripheral edge portion of said plate; and a plurality of circumferentially disposed, radially spaced guard fingers provided on said plate in rotational advance of each of said slots and projecting axially outwardly from said one side of said plate a distance greater than said cutting edge, each of said guard fingers having a leading edge surface tapering forwardly toward said plate in the direction of rotation of said blade.

14. A cutter blade as defined in claim 13, wherein the extreme outer peripheral edge portion of said plate, except in the area of said slots, is defined by a circumferential flange projecting axially outwardly from said one side of said plate a distance greater than said cutting edge.

15. The combination with a rotary vegetation-cutting blade having a central axis of rotation, an extreme outer edge portion and a sharpened cutting edge extending a distance inwardly from said outer edge portion and arranged to sever vegetation coming in contact therewith during rotation of said blade, of a plurality of relatively closely spaced apart guard fingers carried for rotation with said blade and arranged in rotational advance of the cutting edge of said blade and in angular intersecting relation to the path of rotation of said cutting edge, said guard fingers being operable upon rotation of said blade to deflect relatively large size objects out of the path of rotation of said cutting edge while permitting relatively smaller size vegetation to enter therebetween into the path of rotation of said cutting edge.

References Cited in the file of this patent
UNITED STATES PATENTS
2,859,581    Kroll et al. _____ Nov. 11, 1958